United States Patent
Bognet et al.

(10) Patent No.: US 12,116,100 B2
(45) Date of Patent: Oct. 15, 2024

(54) LIGHTWEIGHT ROTARY SAIL AND APPLICATION OF SUCH A SAIL

(71) Applicant: FARWIND ENERGY, Nantes (FR)

(72) Inventors: Brice Bognet, Suce sur Erdre (FR); Thierry Lafont, Saint Lieu la Foret (FR); Arnaud Poitou, Port Saint Pere (FR)

(73) Assignee: FARWIND ENERGY, Nantes (FR)

( * ) Notice: Subject to any disclaimer, the term of this patent is extended or adjusted under 35 U.S.C. 154(b) by 0 days.

(21) Appl. No.: 18/276,035

(22) PCT Filed: Feb. 7, 2022

(86) PCT No.: PCT/EP2022/052921
§ 371 (c)(1),
(2) Date: Aug. 6, 2023

(87) PCT Pub. No.: WO2022/167668
PCT Pub. Date: Aug. 11, 2022

(65) Prior Publication Data
US 2024/0300630 A1 Sep. 12, 2024

(30) Foreign Application Priority Data
Feb. 5, 2021 (FR) ........................ 2101157

(51) Int. Cl.
*B63H 9/02* (2006.01)
*B63J 3/00* (2006.01)
(Continued)

(52) U.S. Cl.
CPC .................. *B63H 9/02* (2013.01); *B63J 3/00* (2013.01); *F03D 3/005* (2013.01); *F03D 9/11* (2016.05);
(Continued)

(58) Field of Classification Search
CPC .......... B63H 9/02; B63J 3/00; B63J 2003/002; F03D 3/005; F03D 9/11; F05B 2240/211; F05B 2240/93
See application file for complete search history.

(56) References Cited

U.S. PATENT DOCUMENTS

| | | | |
|---|---|---|---|
| 4,401,284 A | 8/1983 | Austin | |
| 4,602,584 A | 7/1986 | North | |

(Continued)

FOREIGN PATENT DOCUMENTS

| | | | |
|---|---|---|---|
| CH | 124470 A | | 10/2004 |
| DE | 416586 C | * | 12/1924 |

(Continued)

OTHER PUBLICATIONS

Babarit Aurélien et al., "Exploitation of the far-offshore wind energy resource by fleets of energy ships—Part 1: Energy ship design and performance", vol. 5, No. 3.

(Continued)

*Primary Examiner* — David E Sosnowski
*Assistant Examiner* — Wayne A Lambert

(57) ABSTRACT

The invention relates to a Flettner rotary sail (800) capable of turning about a vertical axis, and comprising an aerodynamic surface of rotation extending between a proximal end and a distal end, comprising, between its two ends, a plurality of sections centered on the vertical axis and extending along said axis between two parallel circular hoops, respectively of diameter 2r, and $2r_2$, the hoops being spaced apart by a distance 2h along the vertical axis, the shape of the aerodynamic surface of the section being defined by the revolution of a continuous meridian curve comprising, between the two hoops, a groove of radius $r_0$ less than or equal to $r_1$ and less than or equal to r2.

9 Claims, 9 Drawing Sheets

(51) Int. Cl.
 F03D 3/00 (2006.01)
 F03D 9/11 (2016.01)
(52) U.S. Cl.
 CPC .... *B63J 2003/002* (2013.01); *F05B 2240/211* (2013.01); *F05B 2240/93* (2013.01)

(56) References Cited

U.S. PATENT DOCUMENTS

2009/0241820 A1* 10/2009 Rohden .................... B63H 9/02
 416/4
2011/0232555 A1* 9/2011 Levander ................. B63H 9/02
 114/39.3
2013/0055944 A1 3/2013 Poulsen

FOREIGN PATENT DOCUMENTS

JP 2014046912 A 3/2014
SU 1507646 A1 9/1989

OTHER PUBLICATIONS

A. De Marco et al. "Flettner Rotor Concept for Marine Applications: A Systematic Study" International Journal of Rotating Machinery, vol. 2016.

* cited by examiner

LIGHTWEIGHT ROTARY SAIL AND APPLICATION OF SUCH A SAIL

RELATED APPLICATIONS

This application is a § 371 applications of PCT/EP2022/052921 filed Feb. 7, 2022, which claims priority from French Patent Application No. 21 01157 filed on Feb. 5, 2021, each of which is incorporated herein by reference in its entirety.

TECHNICAL FIELD

The invention relates to a lightweight structure for making a rotary sail. It is more particularly, but not exclusively, dedicated to making a Flettner type rig in which the sail is a rotating cylinder using the Magnus effect.

BACKGROUND ART

The rotary sail also called Flettner rotor from the name of its inventor, has been used for the propulsion of ships, mainly for prototypes.

According to the prior art, this type of sail consists of a cylinder driven in rotation about its longitudinal axis by appropriate means, said longitudinal axis being generally positioned vertically with respect to the hull of the ship, between a proximal end situated on or in the hull of the ship and a distal end, remote from the hull.

Still according to the prior art, the sail is a straight cylinder, the aerodynamic surface of revolution being made of a rigid material.

The Magnus effect implies that a cylinder spinning in an air flow undergoes a thrust perpendicular to both its spinning axis and the direction of the air flow i.e. the wind in the case of a sail.

The conditions defining the thrust and the drag of such a rotor, in particular, according to its geometric characteristics, its spinning speed and wind speed are known form prior art, at least empirically and will not be exposed in detail.

For example, trends to determine the effectiveness of a Flettner rotor are described in: A. From Marco, S. Mancini, C. Pensa, G. Siding, F. De Luca, "Flettner Rotor Concept for Marine Applications: A Systematic Study", *International Journal of Rotating Machinery*, vol. 2016, Article ID 3458750, 2016.

Thus prior teaches that a Flettner rotor is all the more effective as it presents a high slenderness ratio, that is to say a great length with respect to its diameter, and that the norm of the tangential speed Vi at the surface of the cylindrical surface, i.e. $V_t = R\omega$ where $\omega$ is the angular spinning speed and R the radius of the cylinder, is comprised between 2.5 and 3.5 times the norm of the wind speed.

Typically, the length of the cylinder should be greater than at least 5 times its diameter, but larger slenderness ratios are commonly considered.

To give an order of magnitude, a Flettner rotor of 5 meters in diameter with a slenderness ratio of 8 will have a height of 40 meters and will have to spin at 115 rpm for operating in a close to optimal condition at a wind speed of 10 m/s.

All else being equal, the thrust force on a cylinder of radius R is proportional to $R^2$.

Still in terms of order of magnitude, the thrust on the sail, for a given wind speed, is 10 times greater when the sail is spinning at a speed close to the optimum speed, as compared with the thrust on the same but not spinning sail.

Spinning a large solid at speeds required to take full advantage of the Magnus effect while ensuring its rigidity and stability in bending/torsion, poses technical problems.

The operation of a Flettner rotor is further improved by the presence of one or more discs, commonly referred to as "Thom discs", distributed over the length of the cylinder and whose diameter is greater than the diameter of the continuous section of said cylinder.

According to a common design, at least one disc is located at the distal end of the cylinder. This disc affects the flows at the end of the cylinder and increases the ratio between the thrust and the drag, making it possible to obtain a greater thrust at equal spinning speed and slenderness ratio.

Document U.S. Pat. No. 4,401,284 describes a ship comprising a collapsible Flettner rotor, consisting of a sealed and inflatable textile tarpaulin, stiffened by an internal structure comprising mast rings mounted on a cable and connected to the tight tarpaulin by flexible straps. The inflation of the tarpaulin and its deployment, tightens the cable as well as the straps.

Such a device has the drawback of having to maintain an internal pressure in the tarpaulin at a level sufficient to ensure its rigidity, which consumes additional energy and makes the device sensitive to breakdowns or perils at sea. Thus, such a device cannot be the main propulsion mode of a ship.

SUMMARY OF THE INVENTION

The invention aims to solve the drawbacks of the prior art and relates to a rotary sail of the Flettner type able to spin about a vertical axis, and comprising an aerodynamic surface of revolution extending between a proximal end and a distal end, said sail being of a slenderness ratio between its height, measured between said distal and proximal ends, and its envelope diameter, greater than 5 and of an outer envelope diameter greater than or equal to 4 meters, said sail comprising between its two ends a plurality of segments centered on the vertical axis and extending along said axis between two parallel circular hoops, respectively of a diameter 2r1 and 2r2, the hoops delimiting a segment being spaced apart by a distance 2h along the vertical axis, the shape of the aerodynamic surface of each segment being defined by the revolution of a continuous meridian curve (103) comprising between the two hoops a groove radius r0 (113) less than or equal to r1 (1121) and less than or equal to r2 (1122).

This sail shape allows a reduction of the aerodynamic drag as well as a better dynamic stability, with respect to thrust forces.

In addition, this sail shape makes it possible to reduce the mass at equal resistance and thus to reduce the energy required to spin it.

The invention is advantageously implemented according to the embodiments and alternatives exposed hereafter, which are to be considered individually or according to any technically operative combination.

According to an advantageous embodiment, the aerodynamic surface of a segment is made by a membrane stretched between the hoops, said membrane taking the form of a catenoid.

Thus, the use of one or more stretched membranes for the materialization of the revolution surface of the sail structure makes it possible to further reduce the weight and inertia of such a sail and to reduce the power required for driving it in rotation.

The catenoid shape of the segment or segments, contributes to the mechanical stability of the tensioned assembly and also reduces drag and consequently improving the efficiency of the sail.

According to an advantageous embodiment, the membrane of a segment follows an optimal catenoid between two parallel circular hoops of diameter $2r_1=2r_2=2r$ and spaced apart by a length 2h along the vertical axis, the h/r ratio being less than or equal to 0.6627 and the $r_0/r$ ratio between the radius r ($114_1$, $114_2$) of the end hoops and the groove radius $r_0$ being greater than or equal to 0.5524.

This optimum catenoid makes it possible, for a given membrane characteristic, to obtain the lightest possible aerodynamic surface.

According to another embodiment, the membrane of a segment follows an optimized catenoid between 2 parallel circular hoops with a $2r_1=2r_2=2r$ diameter and spaced apart by a 2h length along the vertical axis, the $r_0$ groove radius being comprised between $r_m$ and $1.15 \cdot r_m$ where $$r_m = a_m + K_{a_m}(h, r) \quad \text{[Math. 1]}$$

and $a_m$ is the solution of the equation $$\cosh\left(\frac{h}{a_m}\right) - \frac{h}{a_m}\sinh\left(\frac{h}{a_m}\right) = 0 \quad \text{[Math. 2]}$$

This embodiment is a compromise, offering more shape flexibility than the optimal shape, while maintaining a shape without underlying support.

Advantageously, the membrane of each segment is stretched between two hoops separated by a spacer of a diameter smaller than the catenoid, extending along the longitudinal axis and assembled to each of the hoops. Thus, the sail may be assembled by segments.

According to this embodiment, the sail of the invention advantageously comprises stays extending between the two end hoops of a segment as well as between the spacer and the membrane, and means for tensioning said stays. Thus, the stays make it possible to stiffen and stabilize the assembly without disturbing the aerodynamic flows around the sail.

The invention also relates to the use of a sail according to the invention for propelling a ship, the diameter of the sail being comprised between 4 m and 15 m for a height of said sail comprised between 30 m and 100 m, the sail being driven in rotation about its vertical axis at a speed comprised between 50 rpm and 300 rpm. Thus, the lightweight construction of the sail of the invention makes it possible to use a sail of a large size driven at a relatively high rotational speed in order to obtain a high propulsion force of the ship.

According to an advantageous embodiment, the ship comprises a plurality of sails assembled at their distal end by a structure holding bearings guiding in rotation the distal ends of the sails.

This structure joining the distal ends of the sails makes it possible to vertically stabilize the sails, in particular but not exclusively, with regard to the torque generated by their rotational drive.

This high propulsion force is advantageously implemented in the context of a use where the ship comprises electrical production means, driven by the move of the ship under the thrust of the sail, and energy storage means in the chemical form.

Thus, said ship is capable of moving and tracking windy areas in order to improve the load rate of the energy production means.

BRIEF DESCRIPTION OF THE DRAWINGS

The invention is implemented according to the preferred embodiments, in no way limiting, exposed hereafter with reference to FIG. 1 to FIG. 10 in which.

DESCRIPTION OF EMBODIMENTS

Figure 1:
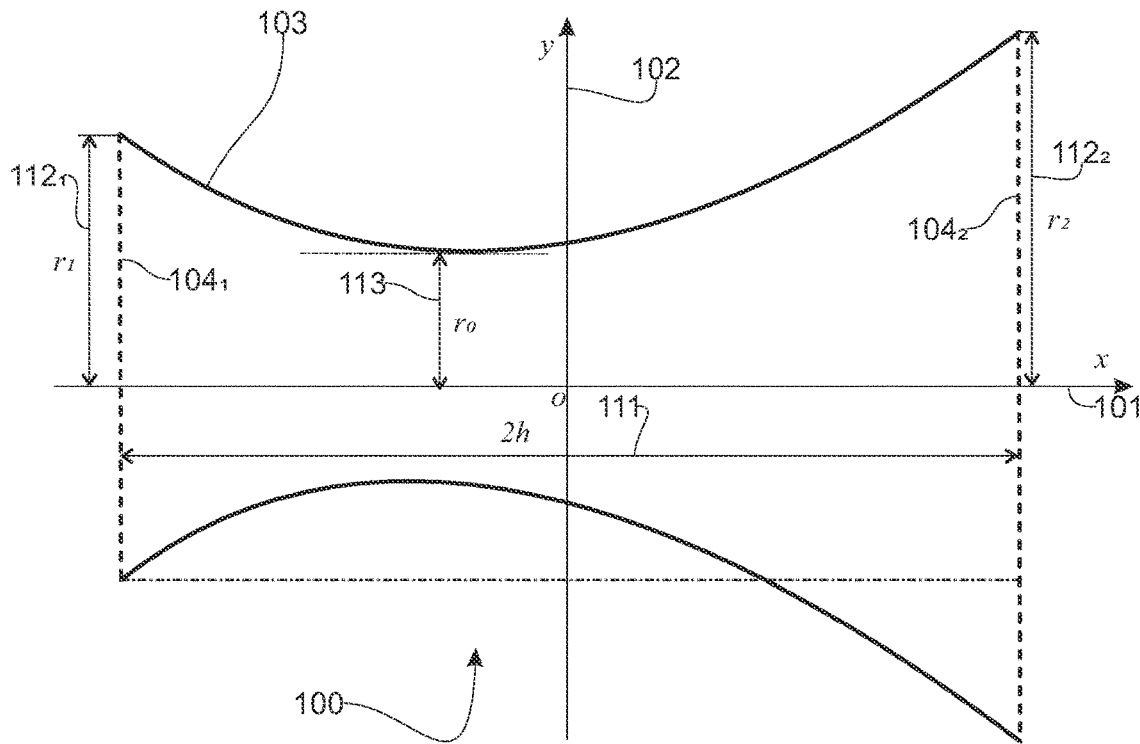
FIG. 1 is an example of the general shape of a segment of a sail of the invention.

With reference to FIG. 1, according to a preferred embodiment, a segment (100) of the sail of the invention is a surface of revolution extending between two concentric circular ends ($104_1$, $104_2$), obtained by the rotation about a longitudinal axis (101) of a continuous meridian curve (103) having a minimum between these two ends, said ends being perpendicular to said longitudinal axis (101).

Nonlimiting examples of surfaces thus defined are hyperboloids, paraboloids or catenoids.

All these surfaces are curves with a minimum and no maximum between the ends ($104_1$, $104_2$). They differ in this respect from the shapes described in the prior art such as in document U.S. Pat. No. 4,401,284.

Thus, the aerodynamic surface has a $2r_1$ diameter ($112_1$) at one end ($104_1$) of the segment and a $2r_2$ diameter ($112_2$) at the other end ($104_2$) of said segment and passes through a $2r_0$ minimum diameter (113), called groove diameter, smaller than each of the end diameters between said ends that are distant by a 2h length (111).

According to exemplary embodiments, the sail comprises a single segment of this type extending between its proximal and distal ends or a plurality of segments superposed along the longitudinal axis thereof, at least one of these segments, up to all of the latter, having this type of shape.

Such a shape has the particular advantage of a low aerodynamic drag, lower than that of a straight cylinder, but also a mechanical stability allowing a lighter construction.

According to exemplary embodiments, the aerodynamic surface is embodied by a skin consisting of a flexible or rigid material extending between the two ends and stretched between these ends. Thus, the tension ensures the stability of the shape without the need for an underlying rigid supporting structure between the ends, so that the structure is light.

Figure 2:
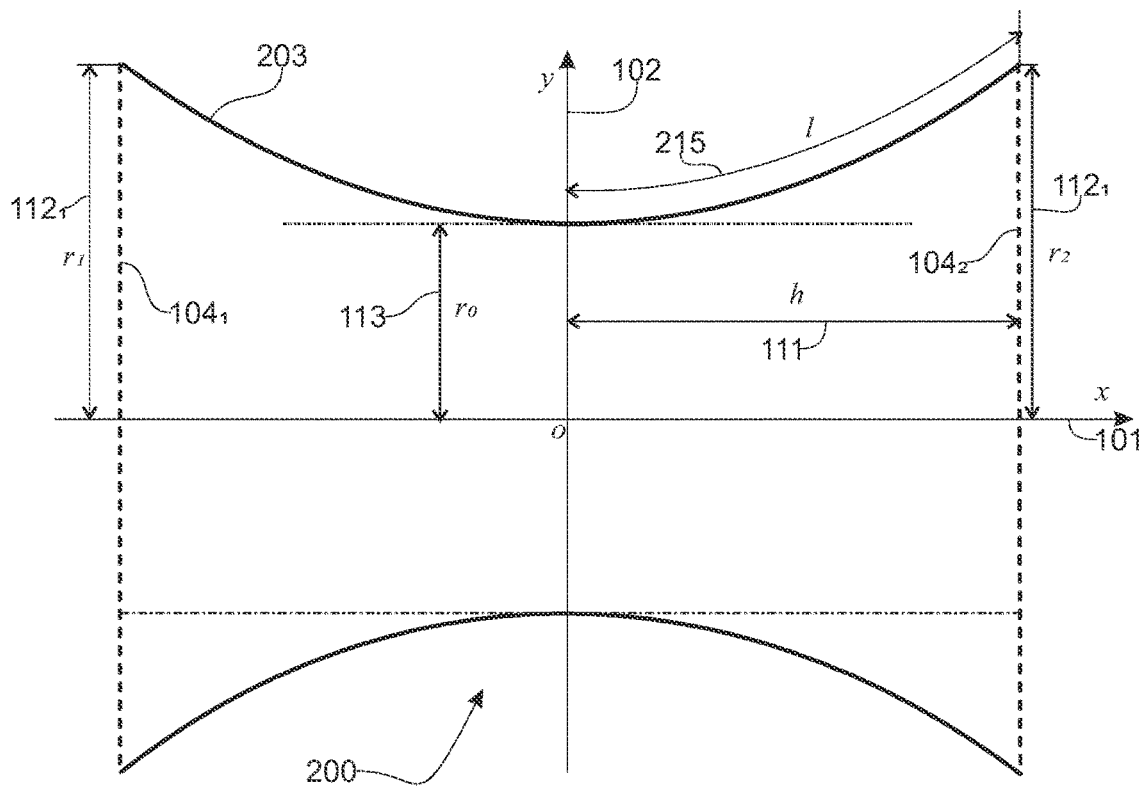
FIG. 2 is an example of a combination geometrical parameters for producing an optimum catenoid segment of a sail of the invention.

With reference to FIG. 2, in particular, according to one embodiment, the aerodynamic surface of segment (200) is materialized by a membrane made of a flexible material, made stiff by its tension between the circular ends, without an underlying supporting structure between the ends of the segment.

According to this exemplary embodiment, the shape of said aerodynamic surface is advantageously a catenoid whose meridian (203) is a catenary curve. This shape makes the mechanical stability of the membrane under the effect of its tension, without mechanical supporting structure between the two ends, and thus makes it possible to achieve a particularly light structure.

To simplify the description of this embodiment, we consider the case where the radii (112$_1$, 112$_2$) of the circular ends of the segment are equal. However, the invention is not limited to this configuration.

According to an exemplary embodiment, the catenoid is thus symmetrical with respect to its minimum radius (113), or groove radius, located at an equal distance h (111) from each of the ends (104$_1$, 104$_2$).

The shape of the catenoid is theoretically constructed by rotating about the longitudinal axis (101) a catenary curve meridian (203) extending between the two ends (104$_1$, 104$_2$).

The catenary curve is defined by its equation in a reference (x,y) frame where, in this figure, the longitudinal axis x (101) is horizontal and y the vertical axis (102), by the equation $$r = r_0 \cdot \cosh\left(\frac{x}{r_0}\right) \quad \text{[Math. 3]}$$

where cosh is the hyperbolic cosine function, and $r_0$ a constant corresponding to the ordinate at the origin of said function and in practice to the minimum groove radius (113) of the catenoid. It is an even function symmetrical with respect to the y axis (102).

Optimal Catenoid Shape

The catenoid offers the advantage of minimizing the surface of the membrane and ensuring the homogeneity of the tension throughout the whole membrane.

Said optimum catenoid is the one corresponding to the minimum surface between the two circles of the ends (104$_1$, 104$_2$). It is the shape of a film joining two rigid circular hoops, which after being soaked in an aqueous solution containing soap, are slowly moved away from each other. The shape obtained is a catenoid which shrinks halfway between the hoops as they are separated from each other, until this surface splits into two discs on each hoop when the distance between the hoops becomes too great.

The optimum catenoid, corresponding to the minimum surface area, is obtained for specific ratios between the radii $r_1$ and $r_2$ (112$_1$, 112$_2$) of the end circles and their spacing 2h (111).

The study of catenoids and more generally of minimum Riemann surfaces is the subject of an abundant scientific literature, only the results useful for the description and implementation of the invention are recited below, which results do not require specific theoretical knowledge to be practically implemented by a person skilled in the art.

Thus, if $r_1=r_2=r$ is the radius of the circles (hoops) at each end of the catenoid and these are separated by a distance 2h, then, if:

$$\frac{h}{r} \leq 0.6627 \quad \text{[Math. 4]}$$

There is a solution that minimizes the surface and tension of the membrane between the hoops. The shape obtained is stable, and the membrane conforms to this shape simply because of its tension without any underlying support.

The h/r ratio being fixed, the $r_0$ parameter, defining the equation of the catenary curve (203), is given by the solution to the equation:

$$r_0 \cdot \cosh\left(\frac{h}{r_0}\right) = r \quad \text{[Math. 5]}$$

which equation is easily solved numerically for example by dichotomy.

As an example of a numerical application for r=5 m; h/r=0.6627; $r_0$=2.74 m; h=3,3135 m, and curvilinear length (215) 2l of the catenary curve is given by:

$$l = r_0 \cdot \sinh\left(\frac{h}{r_0}\right) \quad \text{[Math. 6]}$$

or, according to the same numerical application, 2l=8.36 m, where sinh is the hyperbolic sine function.

Thus, provided with these equations, the person skilled in the art is able to design the membrane required for the construction an optimum catenoid segment as a function of the dimensions and performance targets in terms of mass, spinning speed and thrust targets for the sail.

Without going into more details, as long as the condition:

$$\frac{h}{r} \leq 0.6627 \quad \text{[Math. 7]}$$

is met, the catenoid corresponding to the minimum stable surface between the hoops is obtained for:

$$\frac{r_0}{r} > 0.5524 \quad \text{[Math. 8]}$$

Optimized Catenoid

Figure 3:
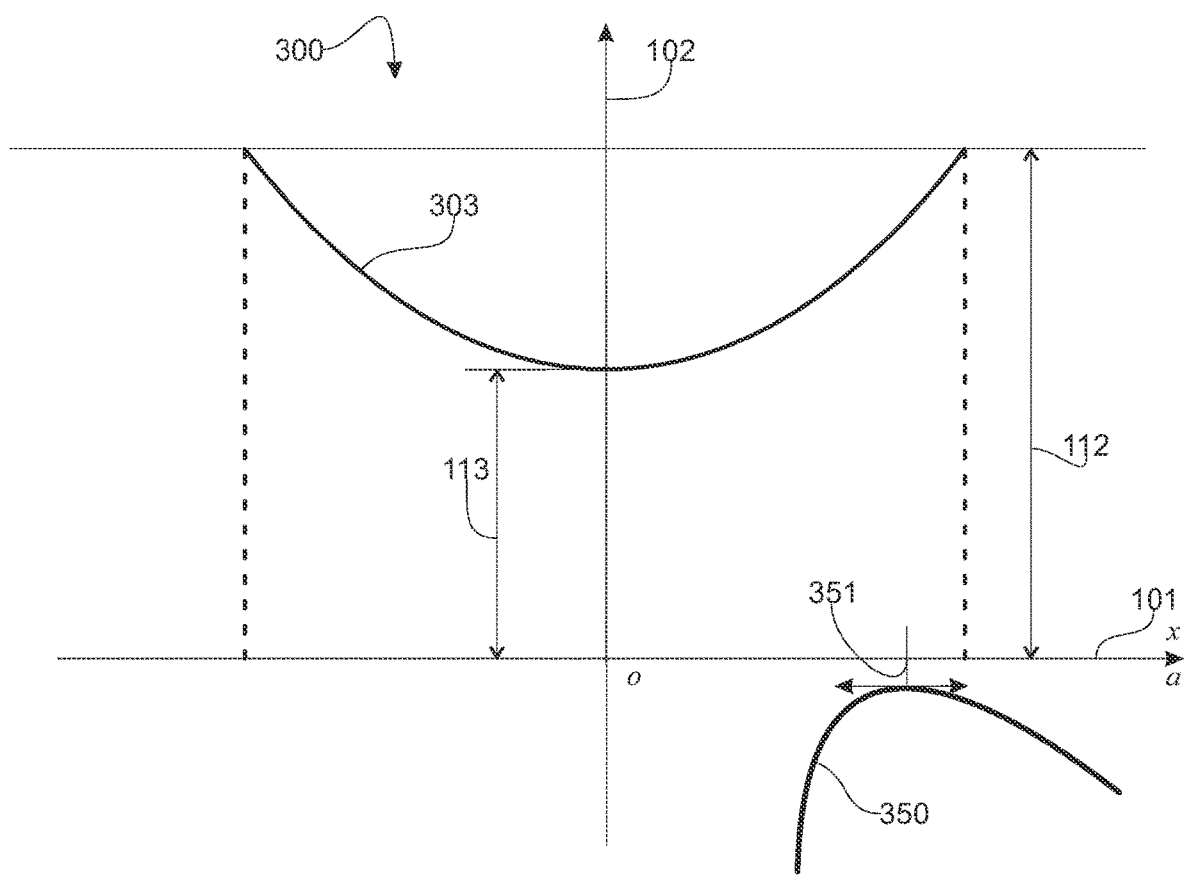
FIG. 3 shows according to a half-view in symmetry along the horizontal axis, an example of a combination of parameters defining a segment of a sail of the invention following an optimized catenoid.

FIG. 3, unlike a film of soapy water whose mechanical strength is almost zero, the membrane used to materialize the aerodynamic surface of a segment according to the invention has a mechanical strength which allows it to withstand the effects of a tension forcing it to follow a geometry other than the optimal geometry.

However, in order to allow this aerodynamic surface to be actually manufactured, it is preferable for the geometry of the membrane to meet defined conditions minimizing the stresses in said membrane for a given tension.

Thus, the equation of the meridian (303) between the two circular ends of radius $r_1=r_2=r$ (112) is given by:

$$y = a \cosh\left(\frac{x}{a}\right) + K_a(h, r) \quad \text{[Math. 9]}$$

With:

$$K_a(h, r) = r + a \cosh\left(\frac{h}{a}\right) \quad \text{[Math. 10]}$$

Where a is a positive parameter that represents the radius of curvature of the meridian at x=0.

In the case of the optimal solution presented above, a is such that $K_a(h,r)=0$ Apart from this optimal case, an optimized shape is defined for conditions defined by the equation:

$$r_m = a_m + K_{a_m}(h, r) \quad \text{[Math. 11]}$$

in which $a_m$ (351) is the value of a, here represented on the x axis (101), which maximize the function $K_a$ (h,r) (350), that is to say such that:

$$\frac{\partial K_a(h, r)}{\partial a} = \cosh\left(\frac{h}{a}\right) - \frac{h}{a}\sinh\left(\frac{h}{a}\right) = 0 \quad \text{[Math. 12]}$$

which equation is easily solved numerically for example by dichotomy.

Inventors determined that a stable stretched membrane is practically feasible between the ends of the segment when:

$$r_m \leq r_0 \leq 1.15 r_m \quad \text{[Math. 13]}$$

By way of example, for r=5 m, h=3.5 m and h/r=0.7 the above equations allow the person skilled in the art to calculate the value of $a_m$, i.e. $a_m$=2.9175 m, and to deduce therefrom $r_m$, i.e. $r_m$=2,636 m Thus, the groove radius $r_0$, as a function of the tension of the membrane, is, according to the invention, comprised between 2.64 m and 3.04 m.

Practical Realization

Figure 4:
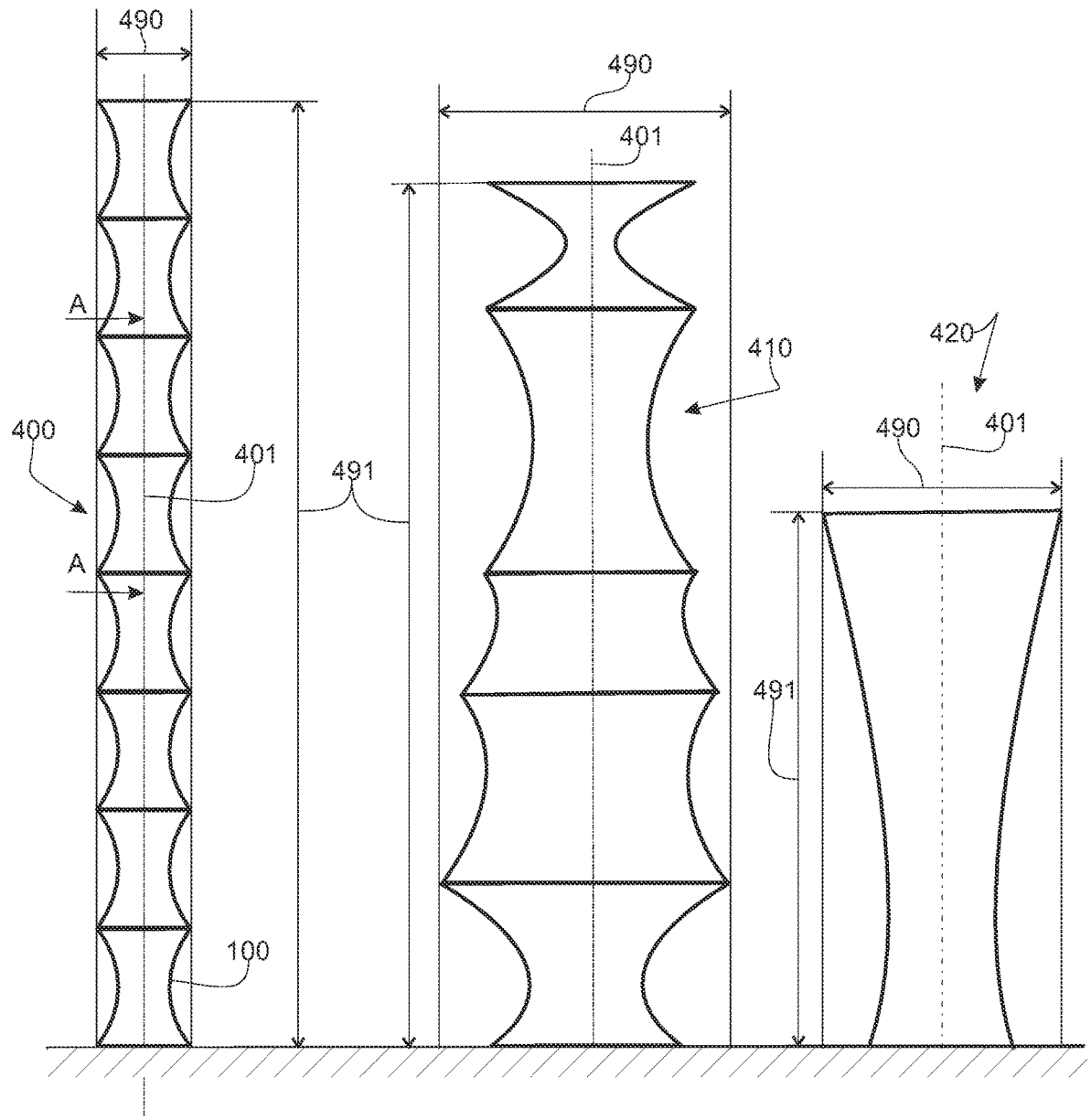
FIG. 4 shows, according to front views, 3 exemplary embodiments of a rotary sail comprising segments corresponding to the geometries taught by the invention.

With reference to FIG. 4, according to an exemplary embodiment, the rotary sail (400) of the invention comprises a plurality of segments (100) stacked along a longitudinal axis (401) placed vertically.

According to this nonlimiting embodiment of the sail (400), the segments are all identical and the hoops at each end of all the segments have the same diameter. However, the invention is not limited to this configuration and, according to alternative exemplary embodiments, the sail (410) comprises segments of evolving diameter and shape along the longitudinal axis (401), or the sail (420) comprises a single segment, the diameters of the proximal and distal ends of which are different.

By convention in this text, the sail (400, 410, 420), whatever its embodiment, is defined, at least, by its envelope diameter (490) which corresponds to the minimum diameter of a straight cylinder centered on the longitudinal axis (401) and containing the entire sail (400, 410, 420), and by its height (491), the ratio between said height (491) and the envelope diameter (490) defining the slenderness of the sail according to this convention.

In operation, the rotary sail is spun around its longitudinal axis (401) by appropriate motorization means. Said motorization means are, according to nonlimiting examples, constituted by an internal combustion engine, an electric motor, a pneumatic motor, a hydraulic motor, a steam motor or even a Stirling or hot air motor.

Figure 5:
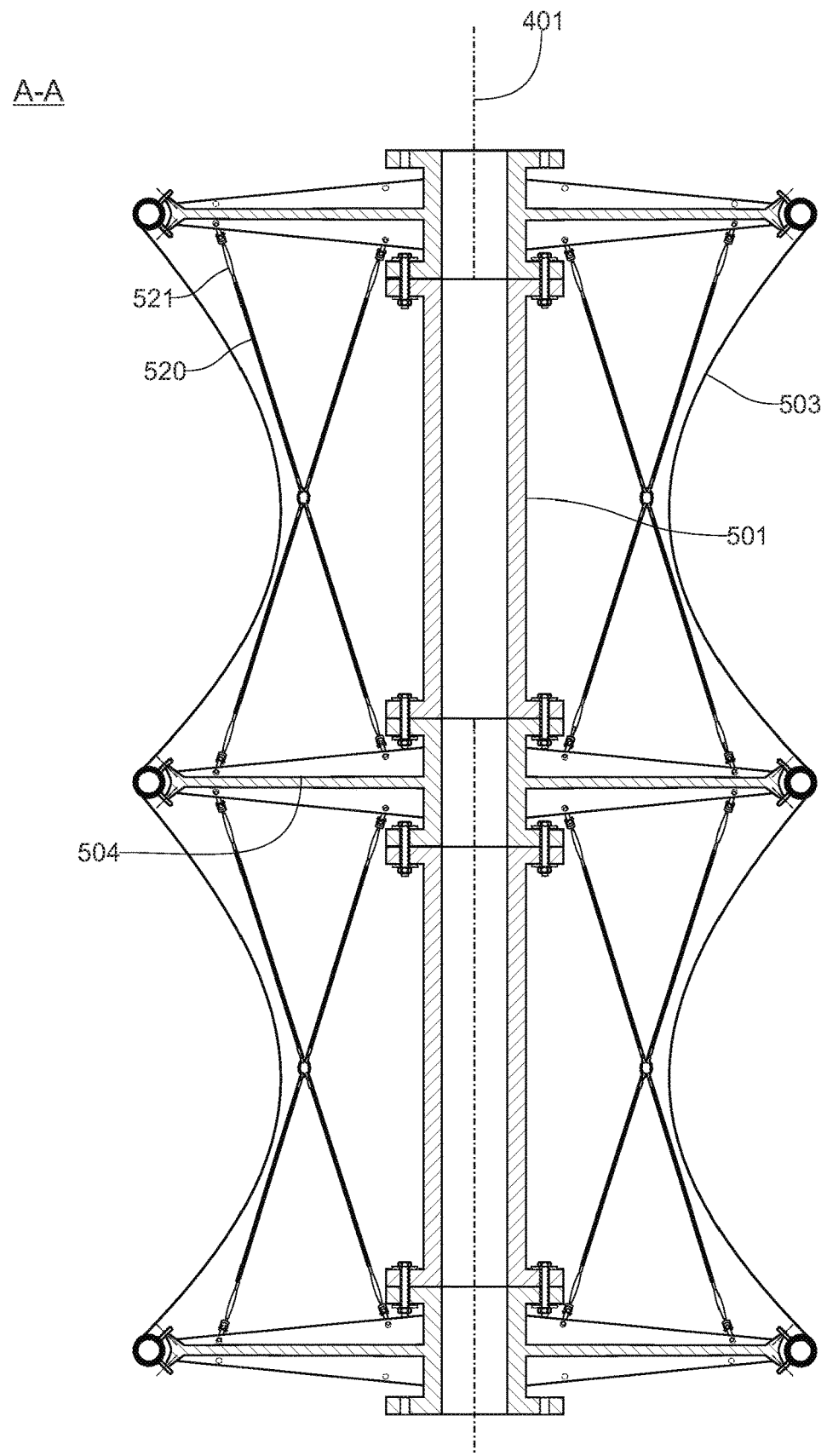
FIG. 5 is a partial view in section AA defined in FIG. 3 of an exemplary embodiment of a sail of the invention.

With reference to FIG. 5, according to an exemplary embodiment, the structure of the sail of the invention comprises a central mast consisting of spacers (501) of tubular section and hoops (504), connected to said spacers, in a stack in the direction and centered on the longitudinal axis (401).

According to this embodiment, the hoops (504) are fixedly arranged to the spacers, for example by bolting. According to an alternative embodiment (not shown), said hoops are connected to the spacers by a pivoting connection rotating about the longitudinal axis (401). These two embodiments differ in the implementation of the spinning drive of the sail.

Regardless of the embodiment, a sail segment extends between two hoops (504) separated by a spacer (501).

The membranes (503) making the outer surfaces of the segments are extending and are stretched between two hoops (504). Thus, except for the hoops located at each longitudinal end of the sail, each hoop is common to two segments and supports two ends of canvas (503).

According to one embodiment, the spacer (501) consists of a tube with an external diameter smaller than that of the external catenoid of the segment, so that said spacer is not visible from the outside of the sail.

According to an exemplary embodiment, the structure is stiffened by stays (520) tensioned between the hoops (504) at each end of a segment, in the inside of said segment, that is to say in a space comprised between the spacer (501) and the stretched membrane (503), so that said stays (520) are not visible from the outside and do not disturb the aerodynamic flow around the sail.

The person skilled in the art understands that for a catenoid shaped aerodynamic surface, the use of the optimized catenoid shape, as defined in FIG. 3, offers more design flexibility, in particular for setting-up this type of arrangement between the membrane and the spacer.

According to exemplary embodiments, the stays (520) are distributed by pairs on the circumference of the hoops (504) in the same segment, with a pair every 120° or every 90°, or every 60°, or every 45°.

Each stay (520) is connected by suitable means to two hoops (504) corresponding to the hoops at the ends of the segment and comprises a tensioner (521) capable of installing a controlled tension in said stay (520).

The tension installed in each stay tends to prestress the spacers (501) in compression and to stabilize the hoops (504) so that the longitudinal axis of a hoop remains coincident with the longitudinal axis (401) of the sail and tends to act as a restoring force toward this configuration when the sail is subjected to forces in operation, more particularly the thrust and drag forces.

According to an alternative embodiment (not shown), the means for tensioning the stays are integrated into the spacer or into a hoop, for example in the form of a screw-nut system making it possible, by its operation, to increase the distance between the two end hoops.

The hoops (504), spacers (501) and stays (520) are made of materials having the required mechanical properties of stiffness, elastic limit, fatigue strength and resistance to external agents, in particular with respect to corrosion, adapted to the intended use, more specifically in a marine environment, and to the conditions of use of the sail.

By way of nonlimiting examples, these materials are chosen from steel, aluminum alloys and composite materials reinforced with glass or carbon fibers.

Figure 6:
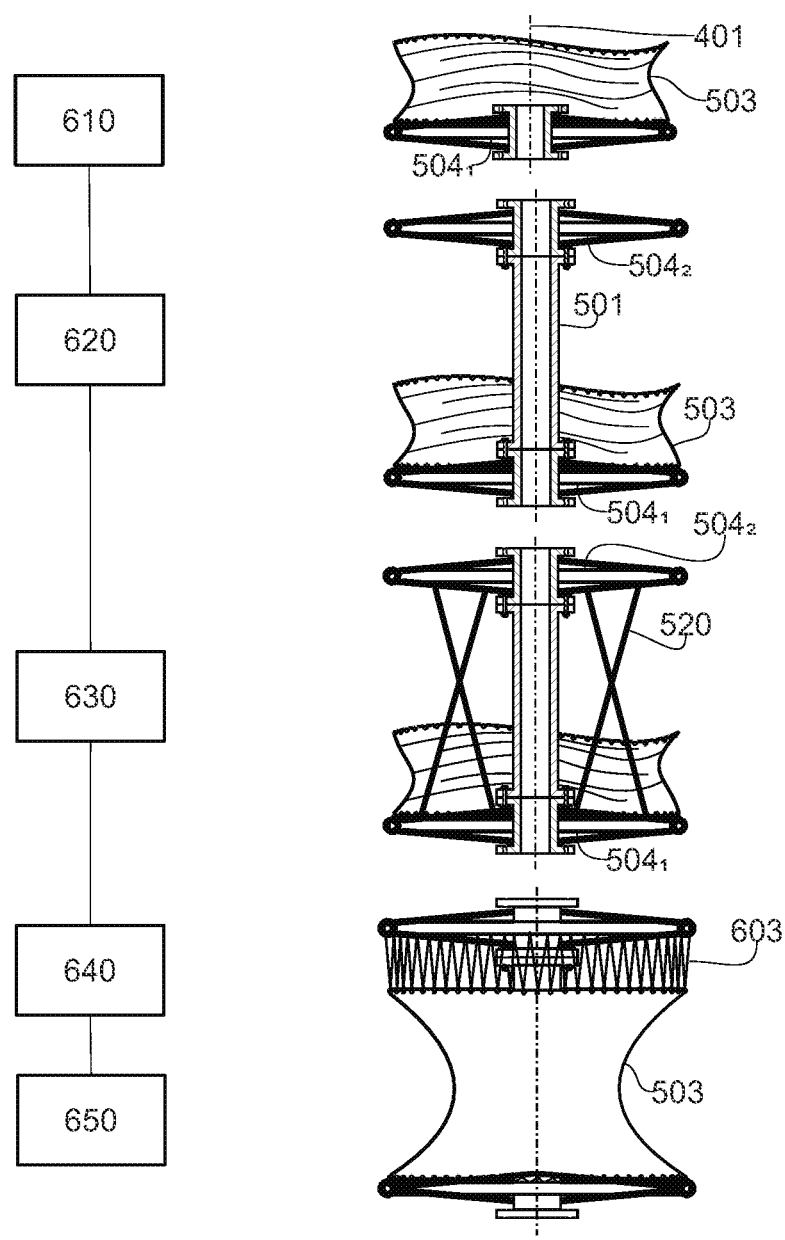
FIG. 6 represents schematically by a flowchart and front views, the successive steps that are implemented for the assembly of an exemplary embodiment of a sail of the invention.

With reference to FIG. 6, the sail is assembled by segment, each segment comprising two hoops ($504_1$, $504_2$), one at each of its ends, shared, when applicable, with the next segment or the preceding segment in the stacking direction of the segments, a spacer (501) between said hoops, stays (520) distributed over the circumferences of the hoops and a membrane (503), connected to the hoops by straps or cables (603) suitable for tensioning the membrane.

According to a first step (610) of connecting the canvas, the membrane (503) is attached to a first hoop ($504_1$).

According to a second step (620) of assembling the rigid structure, a spacer (501) is connected to the first hoop ($504_1$) and a second hoop ($504_2$) is connected to the opposite end of said spacer (501).

According to an optional prestressing step (630), in the case where the segment comprises internal stays (520), said stays (520) are installed between the two hoops ($504_1$, $504_2$) delimiting the section and tensioned by means of their tensioners.

According to a step (640) of installing the membrane (503), said membrane is connected to the second hoop ($504_2$) by straps or cables (603) suitable for tensioning the membrane (503).

According to a step (650) of tensioning the canvas, the canvas is tensioned between the two hoops ($504_1$, $504_2$) by means of the straps or tension cables of the membrane.

The operations described above are repeated for the following segment, the second hoop ($504_2$) becoming the first hoop of the following segment, until the sail assembly is completed.

The person skilled in the art understands that, according to alternative embodiments, step (610) of installing the membrane can be carried out after step (620) of assembling the rigid structure, or after step (630) of prestressing.

Also, when means, for example of the screw-nut type, enabling to increase the distance between the hoops ($504_1$, $504_2$) are implemented, and that moreover these means can be maneuvered after the installation of the membrane, these can be used to adjust the tension in the stays and in the membrane after the membrane installation step (640).

Figure 7:
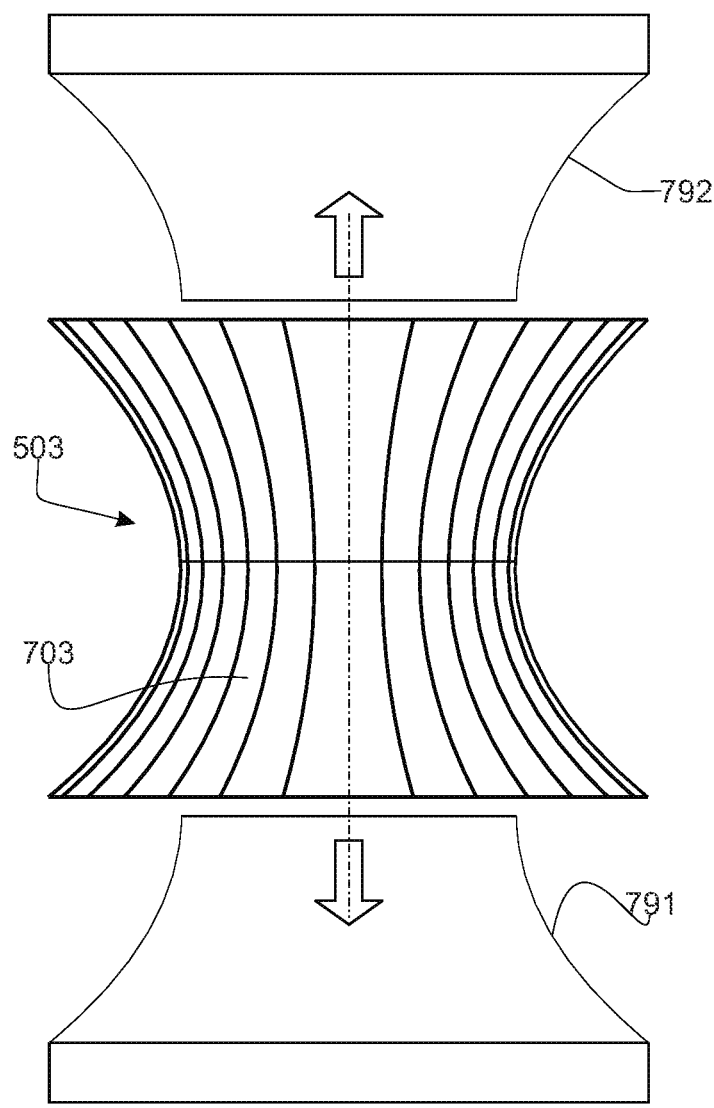
FIG. 7 shows, according to a front view, an example of a tooling for the manufacture of a canvas for a sail of the invention.

Referring to FIG. 7, according to exemplary embodiments, the stretched membrane making the aerodynamic surface of the sail of the invention is preferably, but not exclusively, made of a fluoropolymer such as a polytetrafluoroethylene (PTFE), a tetrafluoroethylene (ETFE), polyvinylidene fluoride (PVDF) chosen for its resistance to environmental conditions and stability, or a fabric of natural fibers, such as cotton, linen, sisal, jute, or polymer fibers, coated with a fluoropolymer.

The membrane is manufactured in the desired shape by assembling together, by gluing or preferably by welding, strips (703) of the selected material, on a mandrel in 2 parts (791, 792), so as to allow the demolding of the shaped membrane.

According to an exemplary embodiment, metallic eyelets (not represented) are added by crimping and punch drilling on the edges of the membrane (503), for the assembly of said membrane with the hoops by means of tension cables. Alternatively, tension straps (not shown) are joined to the membrane by welding, gluing, sewing, stapling or a combination of these methods.

Usage

Figure 8:
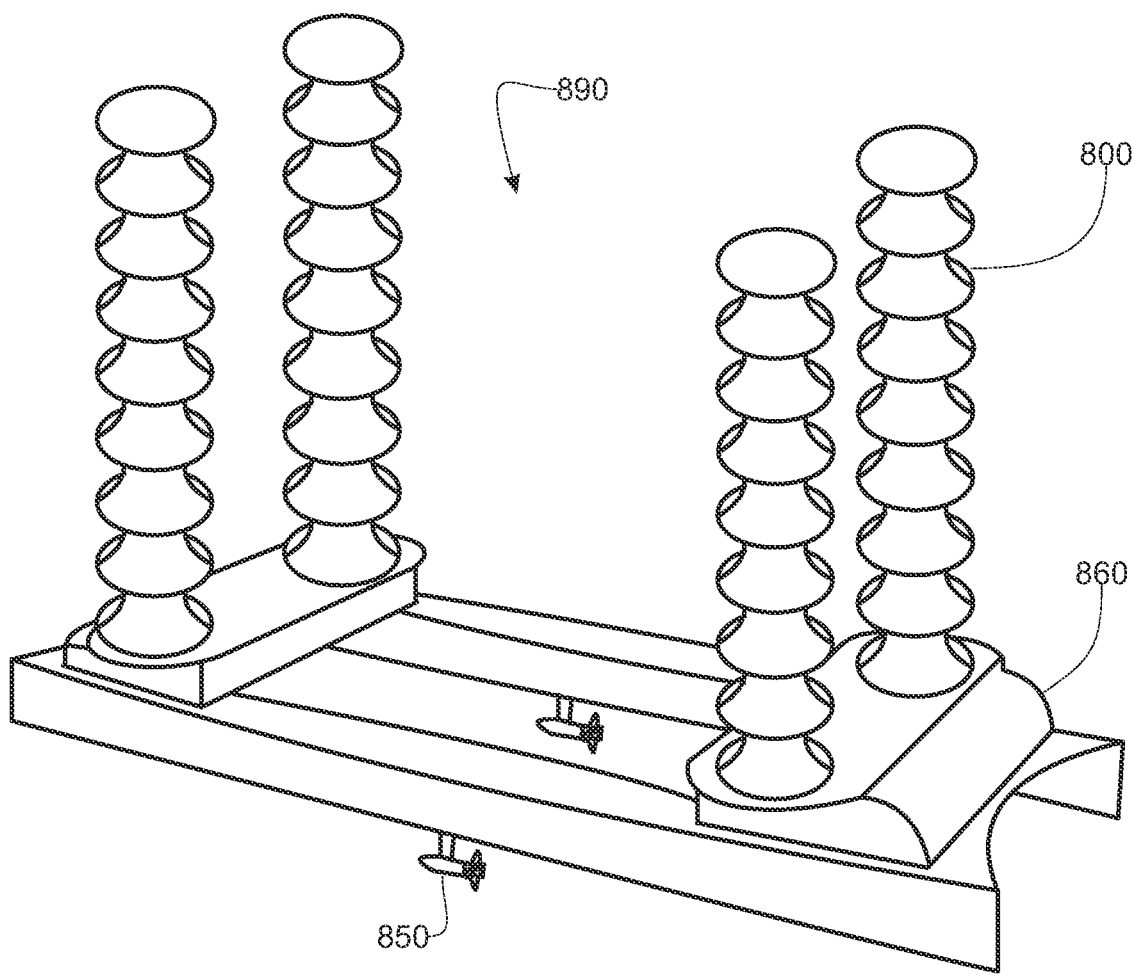
FIG. 8 is a perspective view of an example of a ship propelled by a plurality of sails of the invention.

With reference to FIG. 8, according to an exemplary embodiment, the sail of the invention is used alone or in plurality for the propulsion of a ship (890), as a main propulsion mode, in propulsion assistance or by switching with another propulsion mode.

According to an exemplary embodiment, said ship is used for the production and storage of energy. Thus, according to this example, said ship (890) is propelled by a plurality of sails (800) of the invention, with an envelope diameter comprised between 4 m and 15 m, and a height comprised between 30 m and 100 m measured from the deck of the ship.

Said sails are driven in rotation at a speed comprised between 50 rpm and 300 rpm by a motor, so as to produce a thrust force and drive the ship as a function of the wind.

According to an exemplary embodiment, the ship (890) is intended to produce and store energy.

To this end, according to an exemplary embodiment, the ship (890) being propelled by the sails (800), comprises one or more hydraulic turbines (850) driven by the move of the ship and capable of producing electricity.

This electricity is stored in chemical form in storage means (860) on board the ship.

According to exemplary embodiments, said storage means are batteries, a pressurized or liquefied hydrogen tank, the hydrogen being produced by electrolysis of water, a tank containing methanol, ammonia, methane or a syngas produced from hydrogen, alone or in combination.

The sails (800) of the ship are driven in rotation by taking part of the energy thus produced, either, and preferably, directly at the time of its production, or from the stock.

Figure 9:
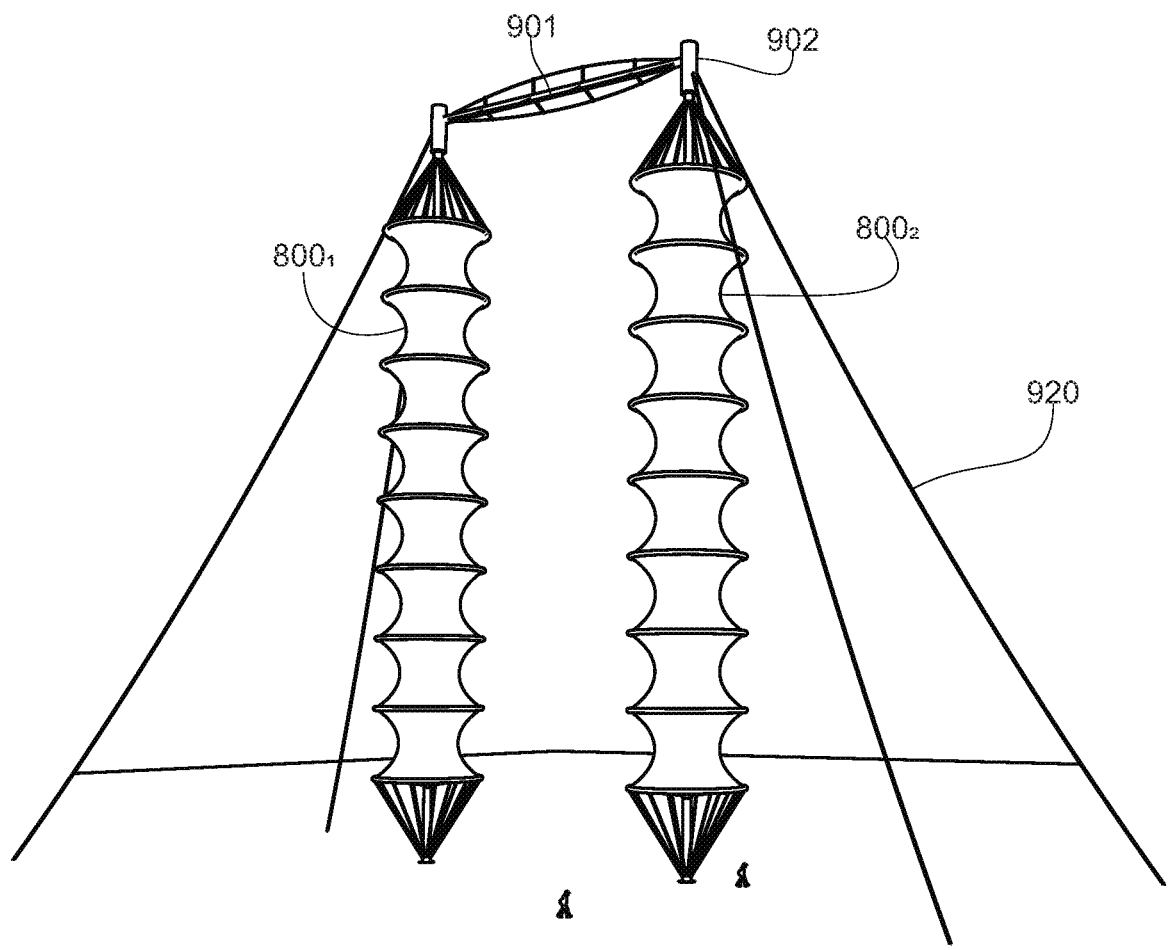
FIG. 9 is an example, according to a perspective view, of an assembly by pair of sails of the invention.

With reference to FIG. 9, according to an exemplary embodiment, the sails of the ship are assembled by pairs ($800_1$, $800_2$) by a lattice structure (901) holding bearings (902) guiding in rotation the distal ends of the sails ($800_1$, $800_2$).

The complete structure is stabilized and linked to the deck of the ship by stays (920).

Figure 10:
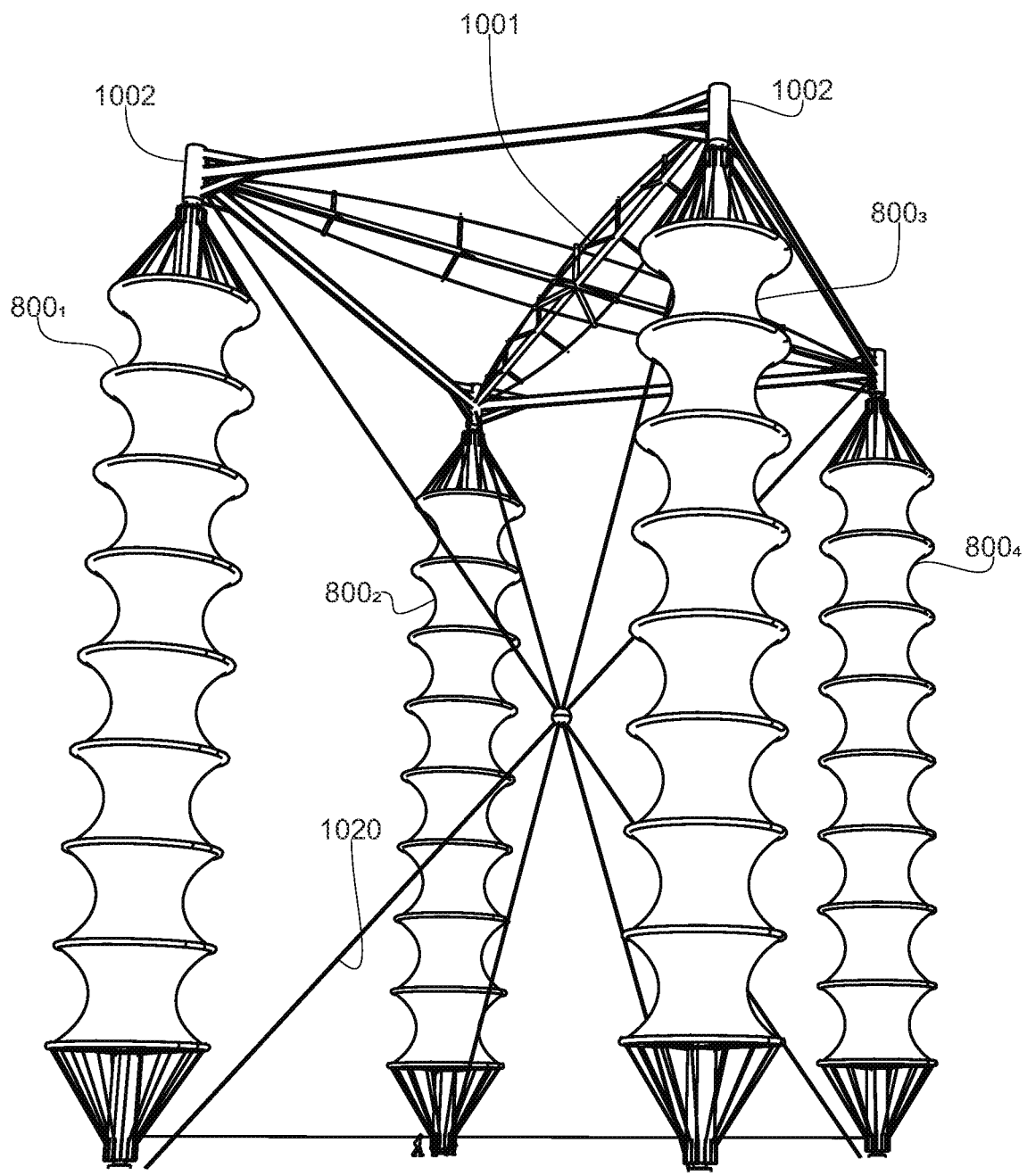
FIG. 10 shows in a perspective view an example of an assembly of 4 sails of the invention.

With reference to FIG. 10, according to another exemplary embodiment, the sails of the ship of the invention are assembled by 4 ($800_1$, $800_2$, $800_3$, $800_4$) by a lattice structure (1001) holding bearings (1002) guiding in rotation the distal ends of the sails.

The complete structure is stabilized and linked to the deck of the ship by stays (1020).

Using rotating sails, the ship of the invention is propelled via these sails for winds up to 30 m/s. The sails being spun, the resulting thrust makes it possible to produce electricity.

For winds of higher speeds, up to 55 m/s, the spinning of the sails is stopped, the low drag of the sails, conferred by their shape, allows them to resist these winds.

The above description and the exemplary embodiments show that the invention achieves the intended aim of producing a rotary sail of the Flettner type of large size and sufficiently lightweight to be driven at a relatively high spinning speed with a reduced power.

The invention claimed is:

1. A rotary sail of Flettner type able to spin about a vertical axis and comprising an aerodynamic surface of revolution extending between a proximal end and a distal end, the rotary sail being of a slenderness ratio between a height, measured between the distal end and the proximal end, and an outer envelope diameter, the slenderness ratio being than 5, the outer envelope diameter being greater than or equal to 4 meters, wherein the rotary sail comprises between the proximal end and the distal end a plurality of segments centered on the vertical axis each segment extending along the vertical axis between two parallel circular hoops, of a $2r_1$ and a $2r_2$ diameters, the two parallel circular hoops being spaced by a 2h distance along the vertical axis, a shape an aerodynamic surface of each segment being defined by a revolution of a continuous meridian curve comprising between the two parallel circular hoops, a groove of a $r_0$ radius less than or equal to $r_1$ and less than or equal to $r_2$.

2. The rotary sail of claim 1, wherein the aerodynamic surface of a segment consists of a membrane stretched between the two parallel circular hoops, wherein the membrane takes a shape of a catenoid.

3. The rotary sail of claim 2, wherein the membrane of a segment follows an optimal catenoid between the two parallel circular hoops of diameter $2r_1=2r_2=2r$ and spaced apart by the 2h distance along the vertical axis, a h/r ratio being less than or equal to 0.6627 and a $r_0/r$ ratio between a r radius of the two parallel circular hoops and a $r_0$ radius of the groove being greater than or equal to 0.5524.

4. The rotary sail of claim 2, wherein the membrane of a segment follows an optimized catenoid between the two parallel circular hoops with a diameter $2r_1=2r_2=2r$ and spaced apart by a 2h distance along the vertical axis, a $r_0$ groove radius is comprised between $r_m$ and $1.15 \cdot r_m$, where:

$$r_m = a_m + K_{a_m}(h, r)$$

and $a_m$ is a solution of equation:

$$\cosh\left(\frac{h}{a_m}\right) - \frac{h}{a_m}\sinh\left(\frac{h}{a_m}\right) = 0.$$

5. The rotary sail of claim 2, wherein the membrane of each segment is a stretched canvas attached to the two parallel circular hoops, the two parallel circular hoops being separated along the vertical axis by a spacer having a diameter less than twice the $r_0$ radius of the groove.

6. The rotary sail of claim 5, wherein each segment comprises stays comprising tensioners, the stays extending between the two parallel circular hoops and between the spacer and the stretched canvas.

7. A use of the rotary sail of claim 1, for propelling a ship, a diameter of the rotary sail, the outer envelope diameter comprised between 4 m and 15 m and the height being comprised 30 m and 100 m, the sail being driven in a rotary motion around the vertical axis at a speed comprised between 50 rpm and 300 rpm.

8. The use of claim 7, wherein the ship comprises a plurality of rotary sails assembled at their distal end by a structure holding bearings for guiding the distal ends of the rotary sails in rotation.

9. The use of claim 7, wherein the ship comprises a hydraulic turbine adapted to generating electricity when the ship is moving propelled by the rotary sail and an energy storage adapted to store generated electricity in chemical form chosen between a battery, a hydrogen tank, a methane tank, a methanol tank, an ammonia tank and a syngas tank.

* * * * *